(12) United States Patent
Thomas et al.

(10) Patent No.: US 11,697,340 B1
(45) Date of Patent: Jul. 11, 2023

(54) ELECTRIC PORTAL WHEEL HUB SYSTEM

(71) Applicants: Robert P Thomas, Phoenix, AZ (US); Jordan Thomas, Centennial, CO (US)

(72) Inventors: Robert P Thomas, Phoenix, AZ (US); Jordan Thomas, Centennial, CO (US)

(*) Notice: Subject to any disclaimer, the term of this patent is extended or adjusted under 35 U.S.C. 154(b) by 745 days.

(21) Appl. No.: 16/701,123

(22) Filed: Dec. 2, 2019

Related U.S. Application Data

(60) Provisional application No. 62/774,073, filed on Nov. 30, 2018.

(51) Int. Cl.
| | |
|---|---|
| B60K 7/00 | (2006.01) |
| B60B 27/00 | (2006.01) |
| B60K 17/04 | (2006.01) |
| B60K 6/26 | (2007.10) |
| B60K 6/36 | (2007.10) |
| B60G 7/00 | (2006.01) |
| B60L 7/10 | (2006.01) |
| B62D 7/00 | (2006.01) |

(52) U.S. Cl.
CPC .......... *B60K 7/0007* (2013.01); *B60B 27/0021* (2013.01); *B60G 7/008* (2013.01); *B60K 6/26* (2013.01); *B60K 6/36* (2013.01); *B60K 17/043* (2013.01); *B60L 7/10* (2013.01); *B60G 2206/124* (2013.01); *B60Y 2200/91* (2013.01); *B60Y 2200/92* (2013.01); *B60Y 2400/607* (2013.01); *B62D 7/00* (2013.01)

(58) Field of Classification Search
CPC .... B60K 7/0007; B60B 27/0021; B60G 7/008; B60K 6/26; B60K 6/36; B60K 17/043; B60L 7/10; B60G 2206/124; B60Y 2200/91; B60Y 2200/92; B60Y 2400/607; B62D 7/00
See application file for complete search history.

(56) References Cited

U.S. PATENT DOCUMENTS

| | | | |
|---|---|---|---|
| 8,323,143 B2* | 12/2012 | Schoon ............... | B60K 7/0007 475/330 |
| 2003/0010551 A1* | 1/2003 | Shirazawa .............. | B62M 7/12 180/65.6 |
| 2006/0012144 A1* | 1/2006 | Kunzler et al. .......... | B60G 3/01 280/124.125 |
| 2014/0000970 A1* | 1/2014 | Munster et al. ...... | B60K 7/0007 475/149 |
| 2014/0125205 A1* | 5/2014 | Landfors et al. ....... | H02K 7/116 310/67 R |
| 2014/0300175 A1* | 10/2014 | Takahashi ............... | B60G 3/20 301/6.5 |
| 2018/0015986 A1* | 1/2018 | Tanaka ................... | B62M 6/75 |
| 2018/0056767 A1* | 3/2018 | Dolgov et al. ....... | B60K 17/043 |

* cited by examiner

*Primary Examiner* — Drew J Brown
(74) *Attorney, Agent, or Firm* — Invention To Patent Services; Alex Hobson

(57) ABSTRACT

An electrical portal wheel hub system is coupled with a wheel and has an electric motor/generator, such as an axial flux motor configured therein and configured to provide power or torque to drive the wheel. The electric motor may be offset vertically from the rotational axis of the wheel to provide additional ground clearance. The electric motor may drive an input gear that is coupled with an output gear that in turns drives the wheel mount and wheel. The gearing ratio can be selected based on the application. A drive axle may from the vehicle may couple with the electric motor and the electric motor may be used to provide supplemental power to drive the wheels. The hub casing may provide mounts for the upper and lower A-arms as well as for a steering arm. The electric motor may act as a generator to charge a battery.

19 Claims, 8 Drawing Sheets

ELECTRIC PORTAL WHEEL HUB SYSTEM

BACKGROUND OF THE INVENTION

CROSS REFERENCE TO RELATED APPLICATION

This application claims the benefit of priority to U.S. provisional Pat. Application No. 62/774,073, filed on Nov. 30, 2018; the entirety of which is hereby incorporated by reference herein.

Field of the Invention

The invention relates to an electric wheel hub coupled with an electric motor that can be used to provide power, supplemental or direct drive power, to a wheel at an offset height from the axel of the wheel, thereby providing greater clearance and eliminating a drivetrain axle.

Background

The off-road industry including the desert racing, rock crawling and four-wheel drive racing is always looking for ways to improve travel of suspension, clearance and overall performance. In addition, many enthusiasts as well as race teams are looking for way to increase acceleration.

SUMMARY OF THE INVENTION

The invention is directed to an electric portal wheel hub system. An exemplary electric portal wheel hub system comprises an electrical portal wheel hub casing configured proximal to a wheel and an electric motor therein. The electric motor may be coupled directly to a wheel or may be coupled through one or more gears. In an exemplary embodiment, the electric motor is coupled with an input gear that drives an output gear that in turn drives a stub axle. In this preferred embodiment, the rotational axis of the electric motor can be vertically offset from the rotational axis of the wheel by a vertical offset distance, thereby providing more ground clearance. This increased ground clearance may be beneficial for off-road vehicles. The electric motors may be the primary or sole power source for driving the wheels or may be a supplemental power source, wherein the wheel is driven by a secondary power source, such as an internal combustion engine. An exemplary electric portal wheel hub system may be configured to provide auxiliary power and torque to the wheel to provide faster acceleration. A drive axle from the vehicle may extend and couple with the electric motor such as by a yoke. The drive axle may have a rotational axis that is aligned with or the same as the rotational axis of the electric motor.

An electric portal wheel hub system may be configured on each wheel of a vehicle or only a portion of the wheels, such as on the front and/or back wheels of a four-wheeled vehicle. In an exemplary embodiment, the back wheels may be powered by a secondary power source and the front wheels may be configured with an electric portal wheel hub system. An exemplary electric portal wheel hub system may be configured on a real trailing arm and an upper pivot A-arm or pivot arm may be coupled with the hub casing.

An electric portal wheel hub system is coupled with an electrical power supply, such as a battery. In an exemplary embodiment, an electric motor acts as a generator, such as when the electric motor is engaged to provide a braking torque to the wheel or when not required for providing torque to the wheel. The electric motor may provide a recharging supply of electricity to the battery to recharge the battery. A control system may engage the electric motor to act as a generator as required to maintain a state of charge of the battery. In an exemplary embodiment, the electric motor/generators are powered by an on board battery pack. Each electric motor controller that controls the motor/generator, such as an axial flux permanent magnet (PM) traction motor/generator. The controller may be coupled with a CANN Bus that takes direction from a CPU and delivers power from the battery pack to the electric motor/generator, such as an axial flux permanent magnet (PM) traction motor/generator.

An exemplary hub casing comprises an inner and an outer casing to enable access to the components therein. The main function of the portal hub casing is to enclose and support the components therein such as the electric motor, gears, bearings, axles and the like. It may be important to prevent dirt and debris from causing damage and creating wear in these parts. The hub casing may be designed for many types of gearing applications and designs that work in concert with the axial flux "pancake" type motor/generator to achieve different performance values. A distinct feature of this hub system is the ability to change the gearing or type of gearing all within the same cavity design while using the same electric motor. An exemplary electric portal wheel hub may be extremely light in weight thereby optimizing the weight to power ratio of the vehicle.

As battery technology and electric motor technology is advancing and improving, these technologies can be adapted and designed into better and higher performance parts and systems to improve performance, torque and speed. Many aspects of the old technologies and the new technologies can be brought together in developed hybrids combining horse power from older types of power plants and new electrical motor integrations working together in new designs and performance capabilities. This new independent drive system works with high horsepower off-road race cars and trucks to UTV's (Utility terrain vehicles).

An exemplary electric motor is a synchronous motor such as an axial flux motor which can be made with a very flat aspect ratio of width to diameter. An exemplary low-profile axial flux motor is a pancake axial flux motor, having an aspect ratio of width to diameter of no more than 1 and preferably less than 0.75, and even more preferably less than 05. An exemplary permanent magnet motor may be an axial flux motor/generator. An exemplary motor is a transverse flux motor which has "ring" shaped windings that couple each stator core to the entire armature ampere-turns. This unique configuration can produce high torque at low RPM's. High torque is achieved by increasing the pole number with no sacrifice of electric loading. An exemplary motor is a synchronous motor with a motor controller. A synchronous electric motor is an AC motor in which, at steady state, the rotation of the shaft is synchronized with the frequency of the supply current; the rotation period is exactly equal to an integral number of AC cycles.

An electric portal wheel hub when used as a single direct drive hub can change the handling characteristics on all four corners of the vehicle. In an off-road application, the two front wheels can work as an all-electric drive system while the rear two wheels are powered by the combustion motor. Another application would be to have all four hubs, front and rear, to be all electric portal hubs and another application would be to have the front two hubs all electric only and the back to be driven by axles connected to the yokes and added power on demand through the rear hybrid electric drive portal hub system. An exemplary electric portal wheel hub may be configured on the front, back or all four wheels of a four-wheeled vehicle and the front and/or back may also receive power from a supplemental power source, such as an internal combustion engine. An exemplary electric portal wheel hub may be configured on the front and or back wheel of a two wheeled vehicle.

The portal wheel hub design allows for the hub casing to suspend the outer loads of the vehicle weight. Certain placement of the electric motor inside the casings and certain milling of the casings will allow for a more stable placement of the gears and the motor to work in harmony and with the weight of the vehicle off loaded, and with the bearings that hold the splines and axles fabricated inside the hub casings, this allows the horizontal torque loads to be balanced and not to damage the gears and splines and to prevent external pressures from causing damage to the electric motor.

Direct drive wheel motors eliminate mechanical transmission losses allowing up to 85% of a vehicle's kinetic energy to be recoverable during braking. When using wheel motors for propulsion and braking, the most impressive feature of which is that safety and vehicle dynamics features such as ABS, stability control, traction control, brake steer, active brake bias, torque vectoring, intelligent cruise control, emergency brake assist and collision avoidance all become customizable and upgradable software functions. When these systems are combined with wheel motors, they allow a new level of performance based active yaw control that unlike most current stability control systems, which only activate in an emergency situation, are active at all times, dynamically fine-tuning understeer and oversteer to enhance cornering speed and safety.

An exemplary drive axle of the vehicle couples with the electric motor at a vertical offset distance from the rotational axis of the wheel. This provides more clearance for the drive axle which is beneficial especially for off-road vehicle. An exemplary vertical offset distance may be about 25 mm or more, about 50 mm or more, about 75 mm or more, about 100 mm or more, about 150 mm or more, about 200 mm and any range between and including the vertical offset distances provided.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
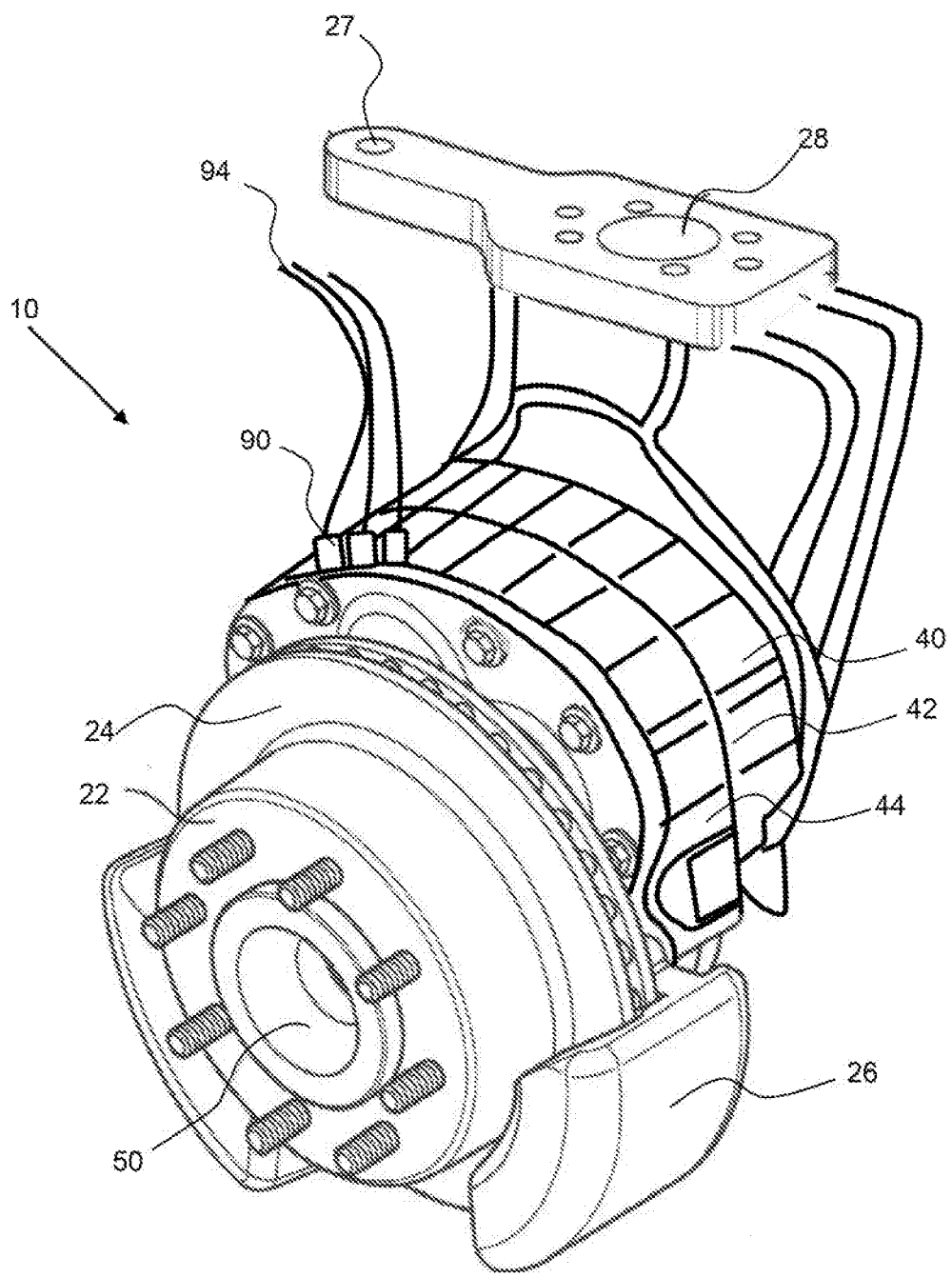
FIG. 1 shows a wheel side view of an exemplary electric portal wheel hub together with the axle stub, disc brake rotor and brake caliper attached to the portal casing.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions: An electric motor as used herein refers to an electrical device that can operate as an electric motor to provide torque output and that in some embodiments, can also act as a generator to produce electrical power from a torque input.

As shown in FIG. 1, an exemplary electric portal wheel hub 10 comprises an electric motor configured within the hub housing 40 that drives the stub axel 50 and therefore a wheel attached to the wheel mount 22. The drive axle of the vehicle couples with the electric motor at a vertical offset distance from the rotational axis of the wheel. This provides more clearance for the drive axle which is beneficial especially for off-road vehicle. Also shown is the disc brake rotor 24 and brake caliper 26 attached to the hub. The exemplary electric portal wheel hub comprises an inner hub casing 42 and an outer hub casing 44. A steering arm mount 27 and an upper A-arm connector mount 28 are coupled with the hub casing 40. An electric motor, such as an axial flux motor is configured inside of the hub and power wires 94 of a wiring system 90 extend into the hub casing to provide power to the electric motor.

Figure 2:
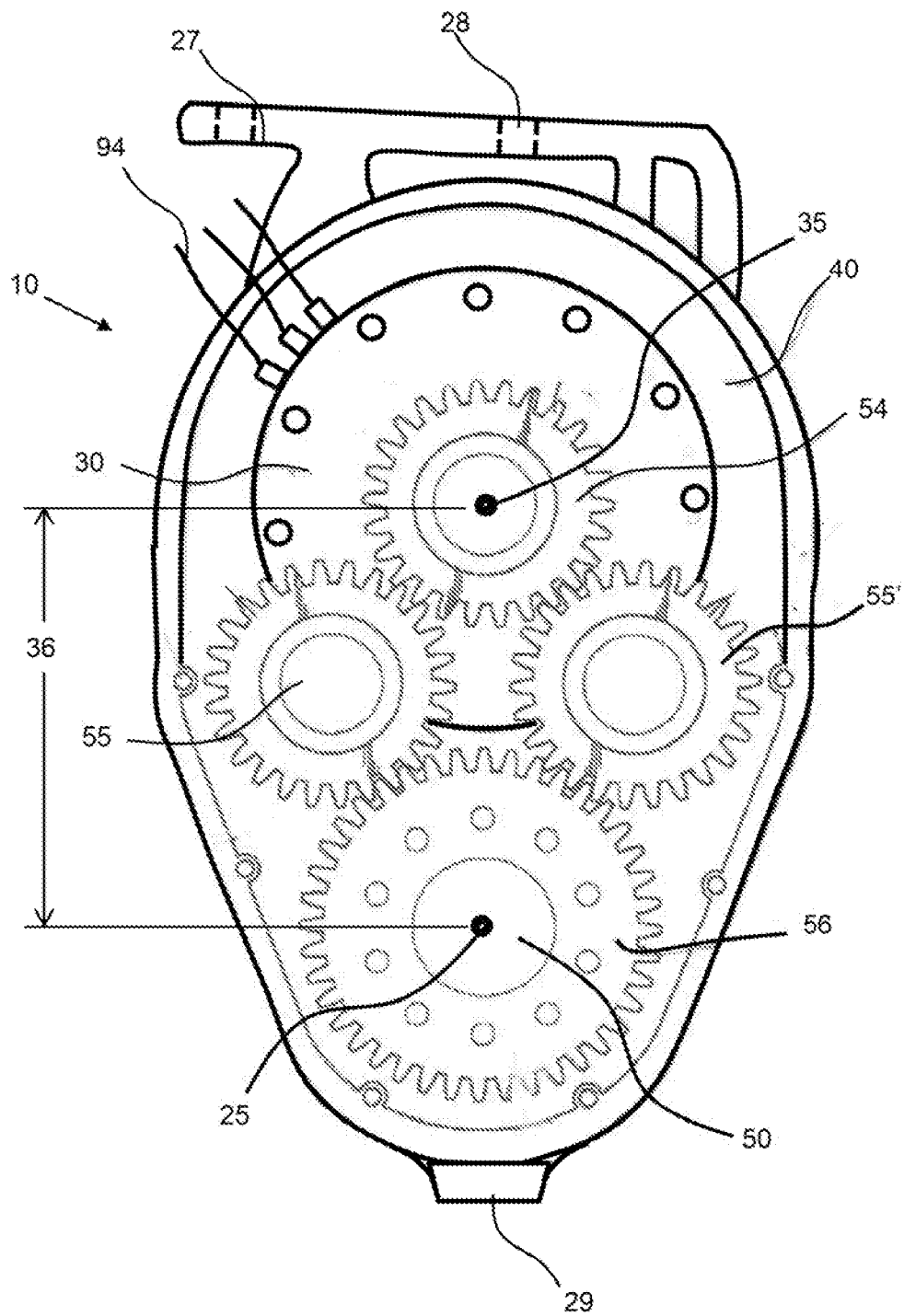
FIG. 2 shows a portal hub casing with an electric motor, an axial flux motor/generator configured inside.

As shown in FIG. 2 an exemplary electric portal wheel hub 10 comprises an electric motor 30 coupled with an input gear 54, a plurality of idler gears 55, 55' and an output gear 56, that is coupled with a spline 52 and ultimately to a stub axle 56 to provide torque and spin wheel. A hub casing 40 is designed around the electric motor and the gearing layout. The lower A-Arm connection mount 29 and upper A-Arm connection mount 28 are shown along with a steering arm 27 connection mount 27. This type of design may be well suited for high torque applications. The gears may be interchangeable to change the torque output for a particular application. The input gear is driven by an electric motor, such as an Axial Flux Motor/Generator 32, and a drive axle coupled with a yoke. The input gear may be powered by the electric motor when additional torque and acceleration are desired and the electric motor may spin in idle when not required or may act as a generator to charge a rechargeable battery as required. This combination of power sources, an electric motor and a secondary power source that drive the vehicle axle provides a lot of versatility. An electric motor, such as an axial flux motor is configured inside of the hub and power wires 94 extend into the hub casing to provide power to the electric motor. The electric motor may be a three-phase motor. As shown in FIG. 2, the electric motor has a rotational axis 35 that is offset a vertical offset distance 36 from the rotational axis of the wheel 25. This offset distance enables more clearance for the wheel and makes this type of electric portal hub well suited for off-road vehicles.

Figure 3:
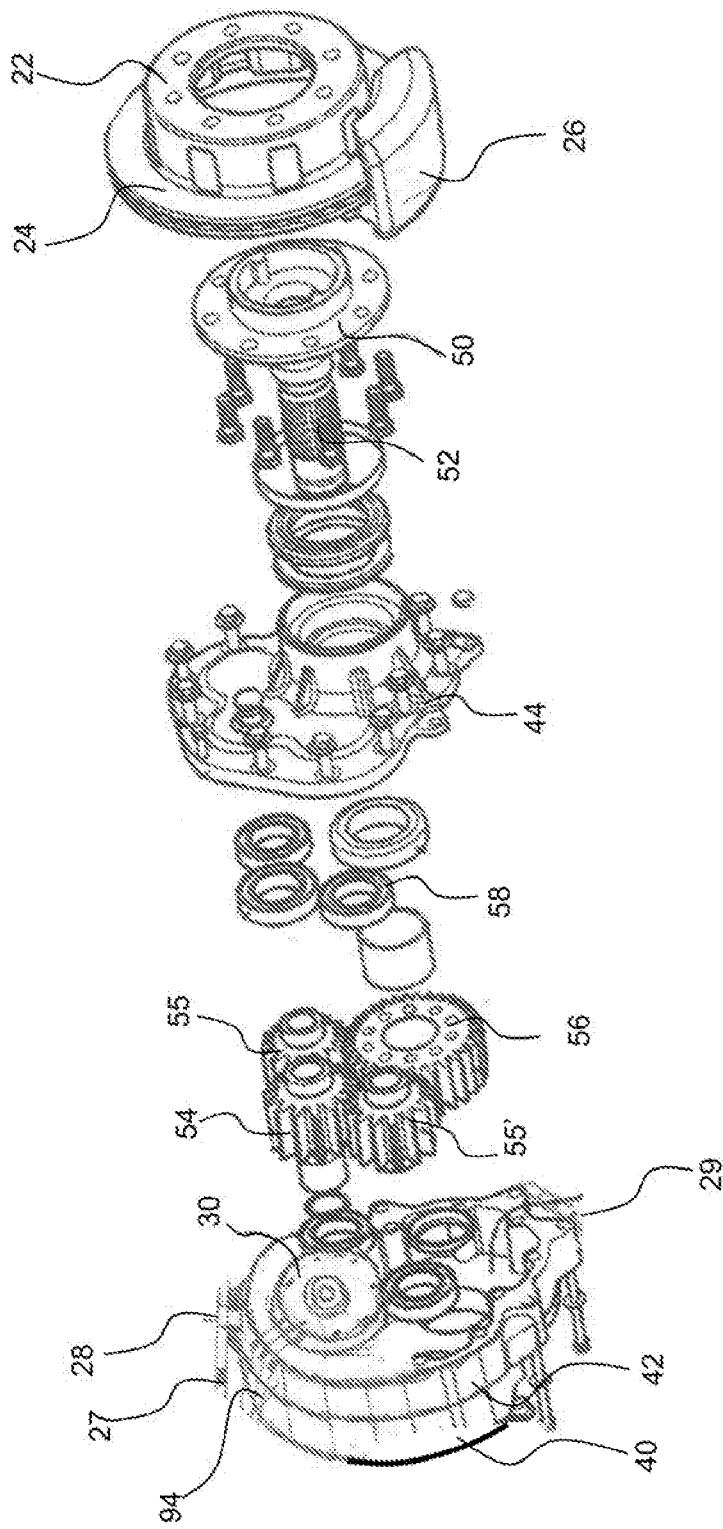
FIG. 3 shows an exploded view of an exemplary electric portal wheel hub assembly.
Figure 4:
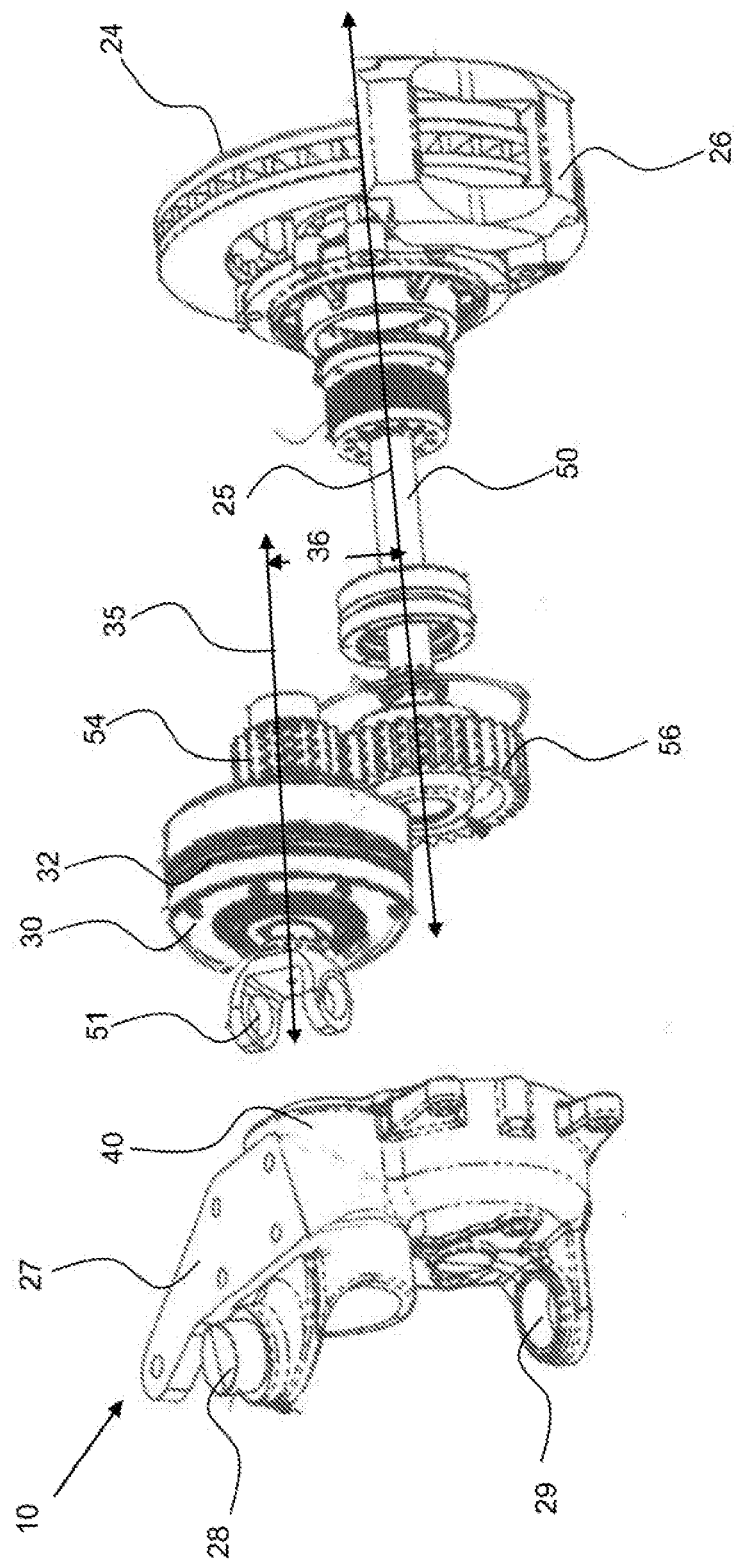
FIG. 4 shows an exploded view of an exemplary electric portal wheel hub assembly.

Referring now to FIGS. 3 and 4 an exemplary electric portal wheel hub 10 comprises an electric motor 30 having a rotational axis 35 that is configured at a vertical offset distance 36 from the wheel rotational axis 25, or the center of the wheel mount 22. The electric motor is configured in a hub casing that may comprise an inner hub casing 42 and an outer hub casing 44. The electric motor is coupled with the input gear 54 to provide torque to the input gear. The input gear drives the output gear directly or indirectly through an arrangement of other gears. As shown in FIG. 3, a pair of idler gears 55, 55' are configured in the gearing arrangement. The bearings 58 for the gears are shown in FIG. 3. The bearings and gears are retained in the hub casing 40. The output gear drives the stub axle 50 which drives the wheel. The wheel is coupled with a brake 24 rotor and a brake caliper 26 is coupled to the brake rotor in a conventional manner. The electric motor may provide a braking resistance to the rotation of the wheel and this braking resistance may act to generate electricity, wherein the electric motor acts as a generator to provide power to electrical devices and/or to charge a rechargeable battery. The outer hub casing 44 comprises another bearing location for the bearings for the stub axle 50 which couples with the output gear 56.

As shown in FIG. 4, an exemplary electric portal wheel hub 10 is configured for medium to high torque and is a high RPM design. In this embodiment, the electric motor 30 may be a pancake type electric motor, such as a pancake axial flux motor 32 that is well suited for fitting into the inner hub casing 42. The rotational axis of the electric motor 35 is offset vertically from the rotational axis of the wheel 25. A drive axle from the vehicle is configured to couple with the yoke 51 which is aligned to have the same rotational axis as the electric motor. A shaft may extend through the electric motor or separate connections may be provided on either side of the motor. A through shaft, through the motor may be a more durable arrangement however. The electric motor is coupled to the input gear 54 and the input gear drives the output gear 56. Again, the output gear is coupled with and drives the stub axle which is engaged with the rotor to drive the wheel. The upper A-arm connection mount 28 and the lower A-arm connection mount 29 are shown coupled to the hub casing 40. The steering arm connection mount 27 is also coupled with the hub casing.

Figure 5:
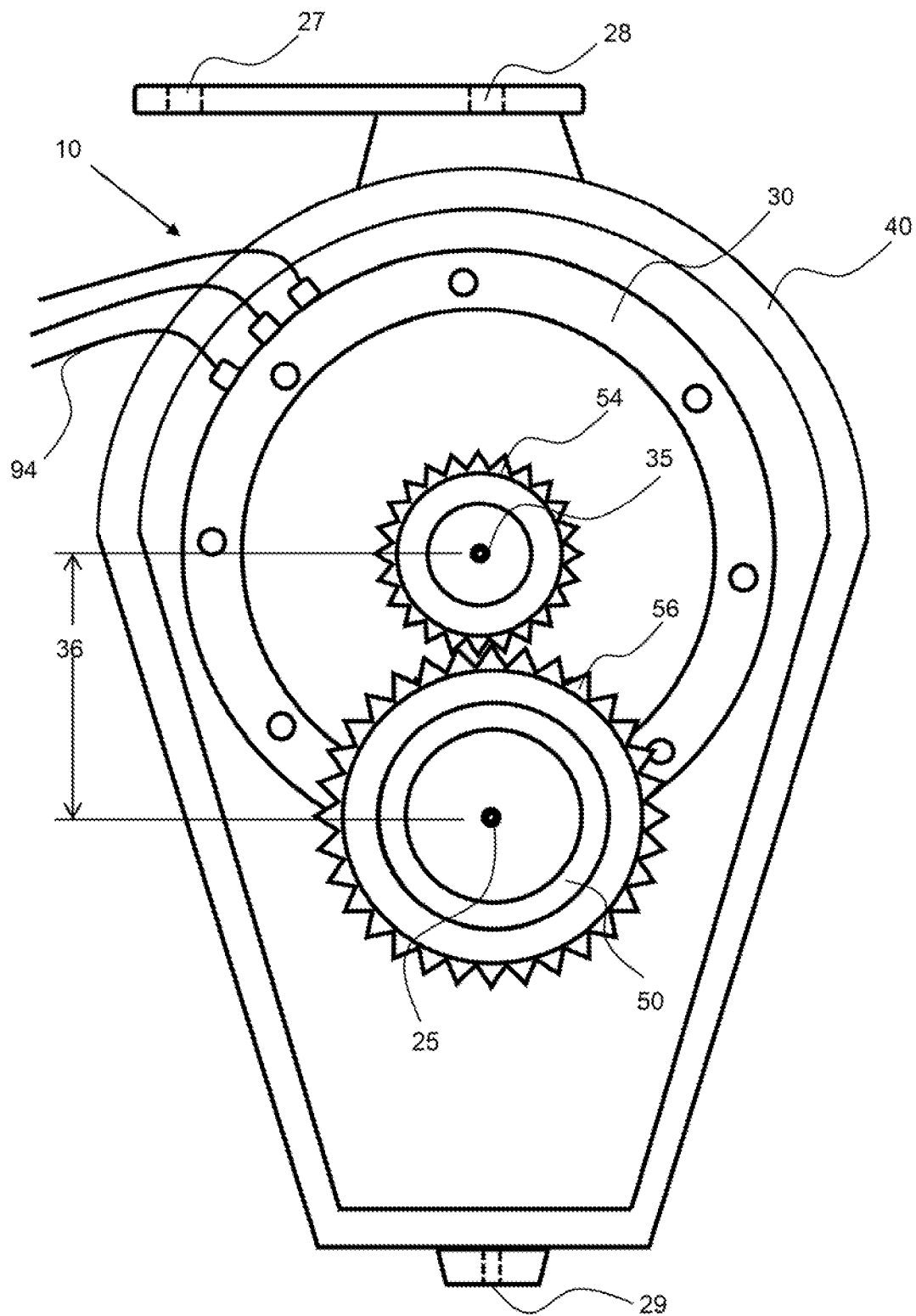
FIG. 5 shows an exemplary hub casing that is designed around the electric motor and an exemplary gearing configuration.

As shown in FIG. 5, an exemplary electric portal hub 10 is configured for a medium to high torque and RPM output. The inner hub casing 42 is configured to retain the electric motor 30 and electrical wires 94 extend into the hub to provide power to the motor or to receive power from the motor when operated as a generator. The electric motor is coupled with an input gear 54 that rotates about the rotational axis 35 of the electric motor. In this embodiment, the input gear is coupled directly with the output gear 56. The output gear may be coupled with a stub axle 50 that drives a wheel. Both the input and output gears may be changed to provide a desired gear ratio. The vertical offset distance 36 between the rotational axis of the electric motor 35 and the rotational axis of the wheel 25 provides additional ground clearance.

Figure 6:
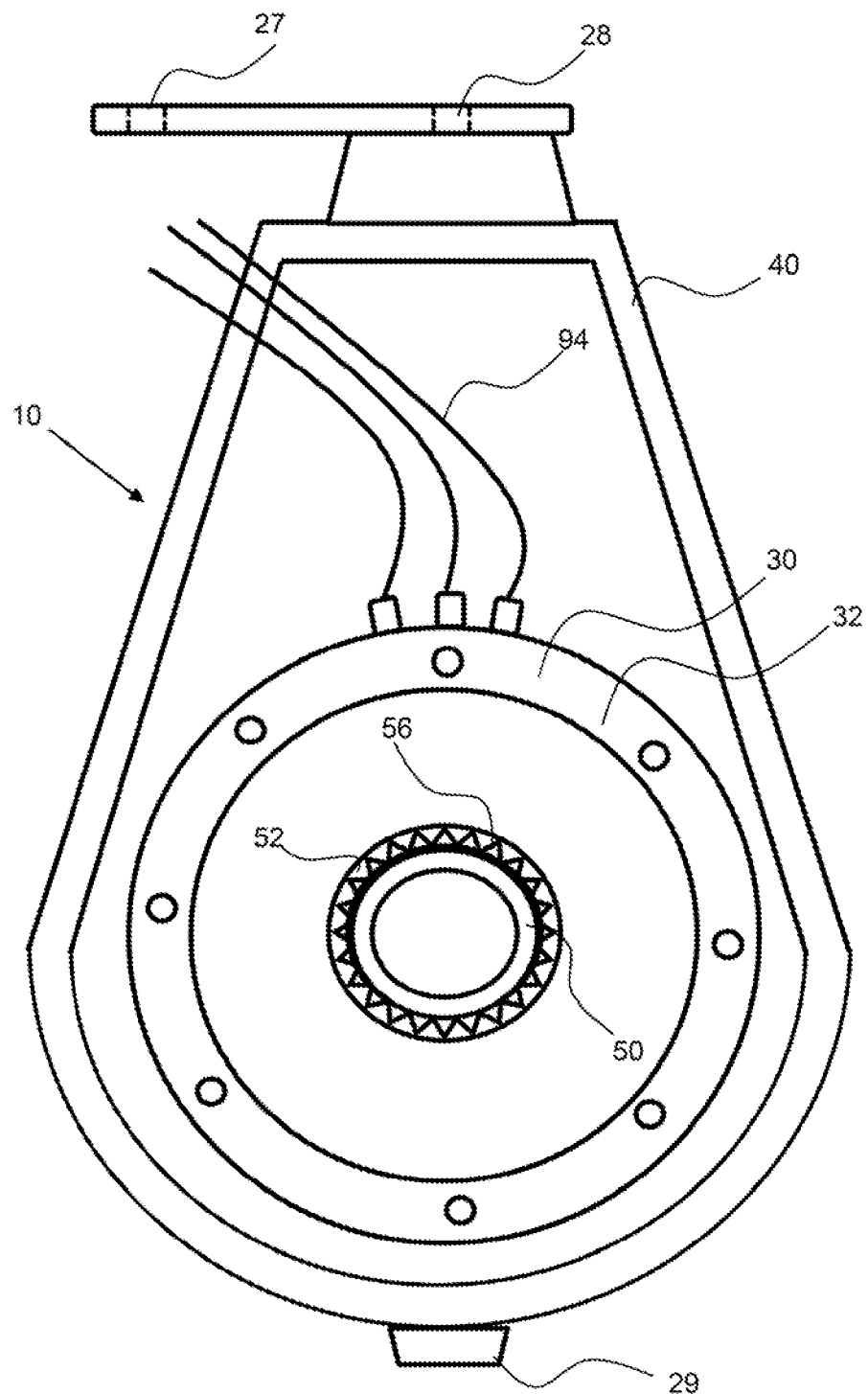
FIG. 6 shows an exemplary hub casing that is designed around the electric motor and an exemplary gearing configuration.

As shown in FIG. 6, an exemplary electric portal hub 10 is configured in a hub casing 40 with an axial flux motor/generator 32 secured inside. The Axial flux motor has an open spline 52 for the stub axle 50 to be coupled thereto. In this embodiment, the electric motor is a direct drive design and may be suitable for low torque applications.

Figure 7:
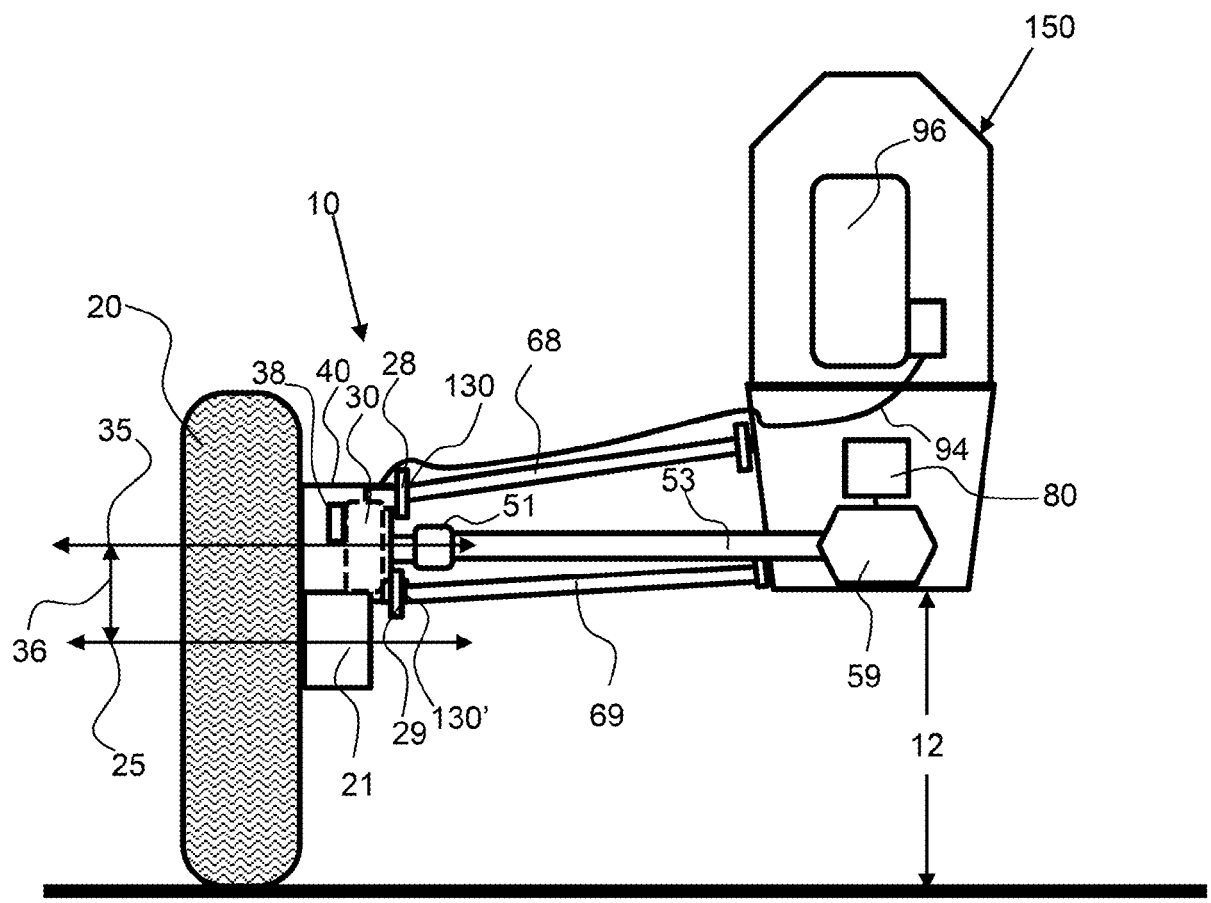
FIG. 7 shows an exemplary electric portal wheel hub coupled to a wheel and with a drive axle of a vehicle.

As shown in FIG. 7, an exemplary electric portal hub comprises an electric motor 30 to provide power and torque to a wheel 20. This power and torque may be supplemental power and torque to a secondary drive or secondary power source 80, such as a combustion engine, that drives a wheel axle 21. As shown, the rotational axis of the electric motor 35 and drive axle 53 are offset vertically from the rotational axis of the wheel 25, or wheel axle, to provide additional clearance from the ground. The vertical offset distance 36 between the rotational axis of the electric motor 35 and the rotational axis of the wheel 25 provides additional ground clearance 12 between the ground and the differential 59, as shown. A drive axle may extend out horizontally from the differential and therefore the ground clearance may be greater between the drive axle and the ground as well. This travel gain may be particularly important in off-road vehicles. The drive axle may extend from a differential 59 and be coupled with a yoke. The upper A-arm 68 is coupled with the upper A-arm connection mount 28 on the hub casing 40 and the lower A-arm 69 is coupled with the lower A-arm connection mount 29 on hub casing. The electrical motor 30 is coupled with a battery 96 and wires 94 extend from battery, through the hub casing 40 and to the electric motor. A vehicle 150 may be configured the hub or the hub casing that is coupled to upper and lower A-arms may be coupled to the hub or hub casing by a pivot arms 130, 130'. A motor controller 38 is shown in FIG. 7.

Figure 8:
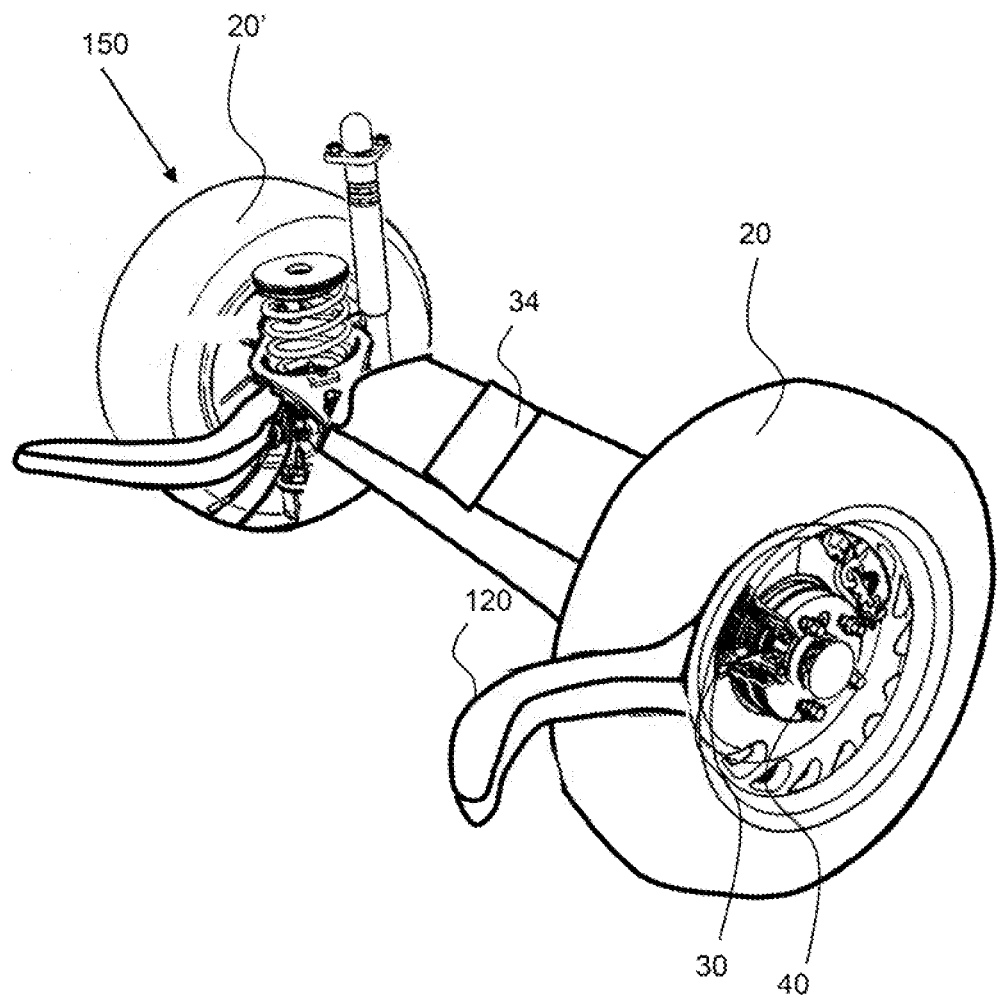
FIG. 8 shows a perspective view of rear wheel of a vehicle having a hub coupled to trailing arms.

As shown in FIG. 8, a vehicle 150 may comprise trailing arms 120 such and the hub 41 or hub casing 40 may be coupled to the trailing arm. A straight axle 34 extends between the two wheels.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An electrical portal wheel hub system comprising:
   a) a hub casing;
   b) an electric motor configured within the hub casing and having a rotational axis;
   c) a battery;
   d) an input gear coupled with the electric motor and driven by said electric motor;
      wherein the input gear is coupled with a wheel and provides torque to drive said wheel;
   e) an output gear that is coupled with the input gear and wherein the output gear drives said wheel;
   f) a drive axle coupled with said electric motor;
      wherein the rotational axis of the electric motor is vertically offset a vertical offset distance from a rotational axis of said wheel;
      wherein the drive axle has a rotational axis that is vertically offset a vertical offset distance above the rotational axis of said wheel; and
      wherein the electric motor is powered by said battery; and
      wherein the input gear is driven by the electric motor.

2. The electrical portal wheel hub system of claim 1, wherein the input gear is driven by both the electric motor and the drive axle to turn the wheel.

3. The electrical portal wheel hub system of claim 1, wherein the drive axel is driven by a secondary power source.

4. The electrical portal wheel hub system of claim 1, wherein the output gear drives a stub axle to drive said wheel.

5. The electrical portal wheel hub system of claim 1, wherein said battery is a rechargeable battery.

6. The electrical portal wheel hub system of claim 5, wherein the electric motor provides electrical power to the rechargeable battery to charge said rechargeable battery, whereby the electric motor acts as a generator.

7. The electrical portal wheel hub system of claim 6, wherein the electric motor provides a braking torque to the wheel when the electric motor acts as a generator.

8. The electrical portal wheel hub system of claim 1, wherein the input gear is configured in the hub casing.

9. The electrical portal wheel hub system of claim 8, wherein the output gear drives a stub axle to drive said wheel and wherein said output gear is configured in the hub casing.

10. The electrical portal wheel hub system of claim 1, wherein the hub casing comprises an upper A-arm connection mount and a lower A-arm connection mount.

11. The electrical portal wheel hub system of claim 1, wherein the hub casing comprises a steering arm connection mount.

12. The electrical portal wheel hub system of claim 1, wherein the electric motor is an axial flux motor.

13. The electrical portal wheel hub system of claim 11, wherein the electric motor is a pancake axial flux motor.

14. The electrical portal wheel hub system of claims 1, wherein the electric motor is a transverse flux motor.

15. The electrical portal wheel hub system of claims 1, wherein the electric motor is a synchronous motor.

16. The electrical portal wheel hub system of claim 1, where the vertical offset distance is at least 50 mm.

17. A vehicle comprising the electrical portal wheel hub system as described in claim 1, wherein the vehicle comprises two wheels, wherein at least one wheel of said two wheels is configured with said electrical portal wheel hub system.

18. The vehicle of claim 17, wherein the hub casing is coupled to a rear trailing arm.

19. The vehicle of claim 17, further comprising a pivot arm coupled with the hub casing.

* * * * *